(12) United States Patent
Kariatsumari et al.

(10) Patent No.: US 9,358,925 B2
(45) Date of Patent: Jun. 7, 2016

(54) WARNING DEVICE FOR VEHICLE

(71) Applicant: JTEKT CORPORATION, Osaka-shi, Osaka (JP)

(72) Inventors: Yuji Kariatsumari, Kitakatsuragi-gun (JP); Ken Matsubara, Matsubara (JP); Yasuyuki Yoshii, Tenri (JP); Tatsuma Kouchi, Kashiwara (JP); Yuichi Miura, Kariya (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 14/516,945

(22) Filed: Oct. 17, 2014

(65) Prior Publication Data

US 2015/0109114 A1 Apr. 23, 2015

(30) Foreign Application Priority Data

Oct. 23, 2013 (JP) .................................. 2013-220196
Aug. 25, 2014 (JP) .................................. 2014-170742

(51) Int. Cl.
| | | |
|---|---|---|
| *B60Q 1/00* | (2006.01) | |
| *B60Q 9/00* | (2006.01) | |
| *G08B 6/00* | (2006.01) | |
| *B60W 50/16* | (2012.01) | |
| *B62D 15/02* | (2006.01) | |

(52) U.S. Cl.
CPC ................. *B60Q 9/00* (2013.01); *B60W 50/16* (2013.01); *B62D 15/029* (2013.01); *G08B 6/00* (2013.01)

(58) Field of Classification Search
None
See application file for complete search history.

(56) References Cited

U.S. PATENT DOCUMENTS

| 5,667,033 | A * | 9/1997 | Shimizu | ............. | B62D 15/0265 180/169 |
|---|---|---|---|---|---|
| 7,072,764 | B2 * | 7/2006 | Donath | .................... | B60R 1/00 340/990 |
| 7,937,219 | B2 * | 5/2011 | Ichinose | ............ | B62D 15/0265 340/436 |
| 7,961,085 | B2 * | 6/2011 | Almqvist | ................. | A61B 5/18 340/407.1 |
| 2005/0021204 | A1 * | 1/2005 | Kudo | .................... | B62D 15/025 701/36 |
| 2005/0149251 | A1 * | 7/2005 | Donath | ................... | G01C 21/26 701/532 |
| 2009/0273458 | A1 * | 11/2009 | Almqvist | ................. | A61B 5/18 340/439 |
| 2010/0188233 | A1 * | 7/2010 | Kuntzel | .................... | A61B 5/18 340/575 |
| 2012/0062375 | A1 * | 3/2012 | Takeuchi | ............ | B60W 50/085 340/441 |
| 2012/0081234 | A1 * | 4/2012 | Shaffer | .................. | G08G 1/167 340/905 |

FOREIGN PATENT DOCUMENTS

| JP | A-11-34774 | 2/1999 |
|---|---|---|
| JP | B2-4292562 | 7/2009 |

* cited by examiner

*Primary Examiner* — Travis Hunnings
(74) *Attorney, Agent, or Firm* — Oliff PLC

(57) ABSTRACT

In a warning device for a vehicle, a basic target current value setting unit sets a basic target current value based on a steering torque and a vehicle speed. When a lane deviation determining unit determines that there is a high possibility that a vehicle will deviate from a lane, a warning vibration wave generator generates a warning vibration wave containing a plurality of frequency components. A target current value is computed by adding the warning vibration wave to the basic target current value. A motor current to be applied to an electric motor is controlled so as to approach the target current value.

12 Claims, 13 Drawing Sheets

F I G . 1
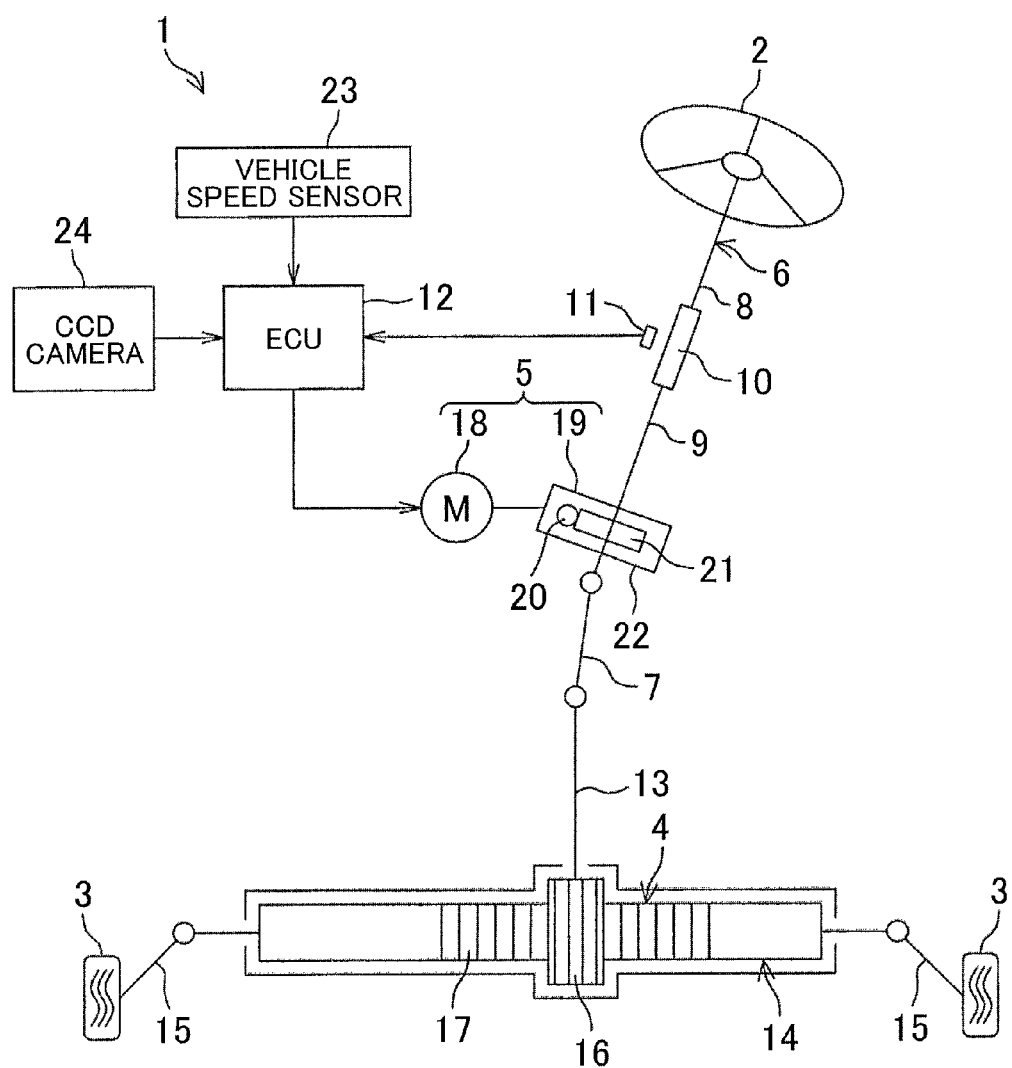

F I G . 12
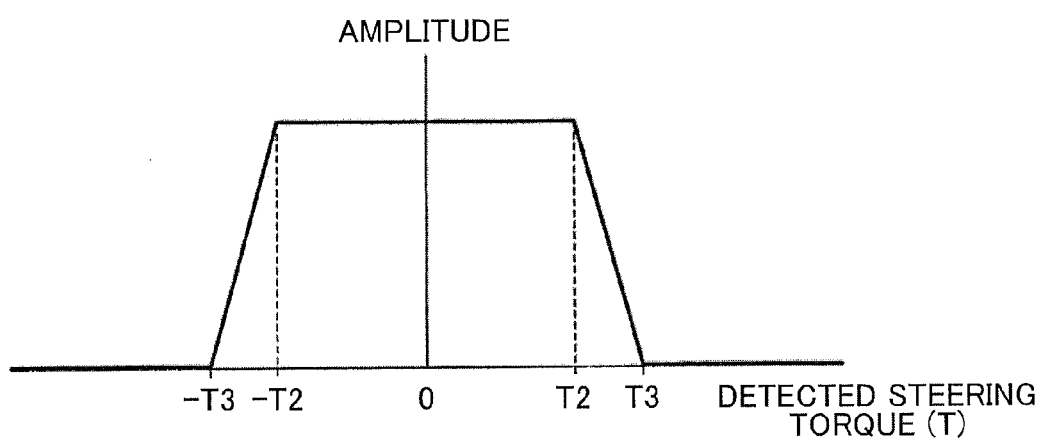

F I G. 14A
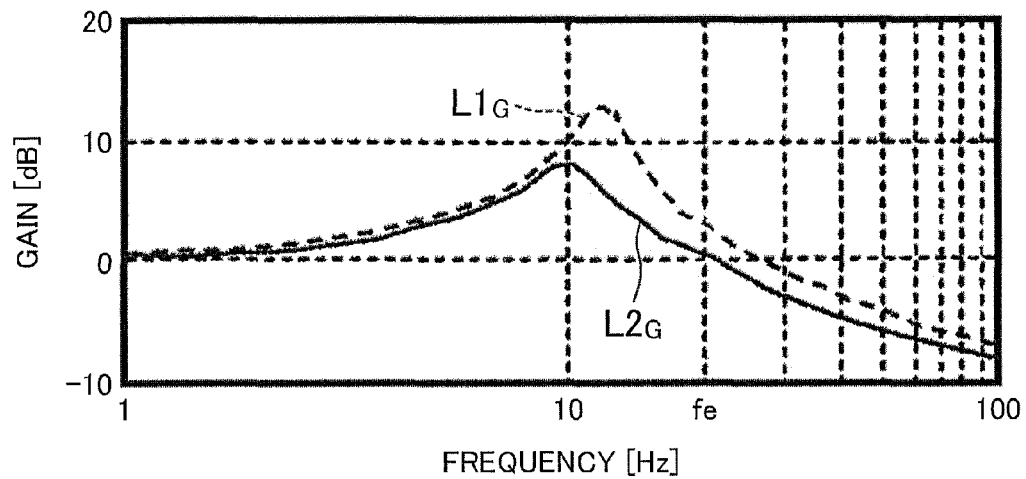
F I G. 14B
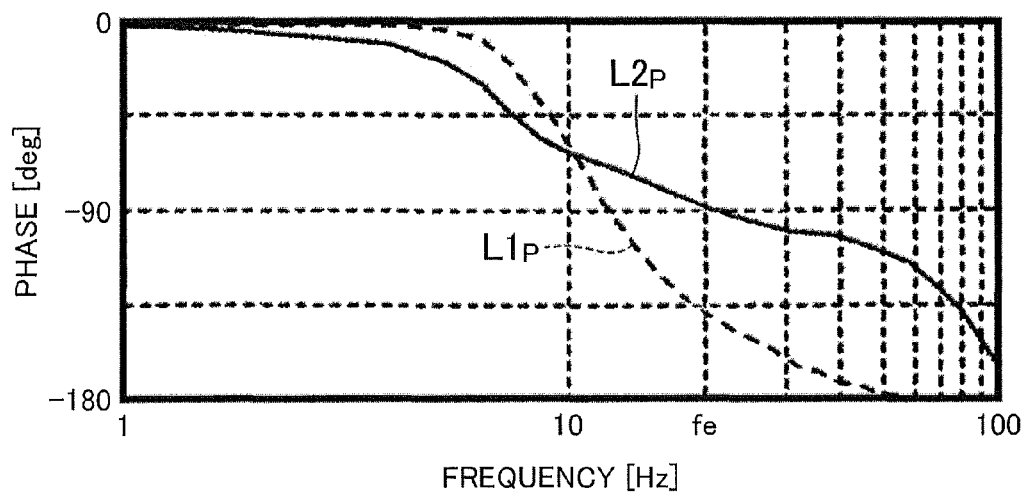

WARNING DEVICE FOR VEHICLE

INCORPORATION BY REFERENCE

The disclosures of Japanese Patent Applications No. 2013-220196 and No. 2014-170742 respectively filed on Oct. 23, 2013 and Aug. 25, 2014, each including the specification, drawings and abstract, are incorporated herein by reference in their entireties.

BACKGROUND OF THE INVENTION

1. Field of the Invention

The invention relates to a warning device for a vehicle, which issues a warning based on the operating state of a vehicle.

2. Description of the Related Art

There is a conventional vehicle having steering assist control functions such as a lane keeping assist function of assisting a driver in executing a steering operation and a lane changing assist function of assisting a driver in changing the lane in order to facilitate travelling of the vehicle along a travelling path. For the purpose of informing a driver of an undesirable steering state during execution of steering assist control, a warning device for a vehicle, which vibrates a steering wheel to issue a warning to the driver, has been being developed, as described in, for example, Japanese Patent No. 4292562 and Japanese Patent Application Publication No. 11-34774.

However, the vibration that is given from the warning device for a vehicle of this type to the steering wheel as a warning (hereinafter, referred to as "warning vibration") may be lost in road noise that is transmitted from a road surface to a steering member through tires. This makes it difficult to transmit the warning vibration to the driver. Therefore, it is necessary to prevent the warning vibration from being lost in the road noise.

SUMMARY OF THE INVENTION

One object of the invention is to provide a warning device for a vehicle, which makes it possible to transmit warning vibration to a driver even if there is road noise.

A warning device for a vehicle according to an aspect of the invention includes: a vibration wave generator that generates a warning vibration wave based on an operating state of a vehicle; and a vibration applying device that applies warning vibration to a steering member based on the warning vibration wave generated by the vibration wave generator. The warning vibration wave contains a plurality of frequency components.

According to the above aspect, the frequency components are contained in the warning vibration wave. Therefore, even if the frequency components contained in the warning vibration wave include a frequency component that coincides with the frequency of the road noise, other frequency components that do not coincide with the frequency of the road noise allow the warning vibration to be transmitted to the driver. Specifically, even if there is road noise, the warning vibration is transmitted to the driver.

In the warning device for a vehicle according to the above aspect, among the frequency components contained in the warning vibration wave, a frequency component having a higher frequency may have a larger amplitude. When the amplitudes of the frequency components that constitute the warning vibration wave are equal to each other, a frequency component having a higher frequency generates lower warning vibration. In the configuration described above, a frequency component having a higher frequency has a larger amplitude. Thus, variations in the magnitudes of warning vibration generated by frequency components are reduced.

In the warning device for a vehicle according to the above aspect, the vehicle may include a vehicle speed detector that detects a vehicle speed; and the vibration wave generator may include a frequency varying device that varies a frequency of the warning vibration wave based on the vehicle speed detected by the vehicle speed detector. In this case, the frequency of the warning vibration wave means the frequencies of the multiple frequency components contained in the warning vibration wave.

A warning device for a vehicle according to another aspect of the invention includes: an electric motor that applies steering assisting force to a steered mechanism of a vehicle; a torque detector that detects a steering torque; a phase compensator that executes phase compensation on the steering torque detected by the torque detector; a basic assist current value setting unit that sets a basic assist current value, based on a phase-compensated torque that is a steering torque the phase of which is compensated by the phase compensator; a vibration wave generator that generates a warning vibration wave having a prescribed frequency based on an operating state of the vehicle; a target current value computing unit that computes a target current value for the electric motor by adding the warning vibration wave generated by the vibration wave generator to the basic assist current value set by the basic assist current value setting unit; and a motor controller that controls the electric motor based on the target current value computed by the target current value computing unit. The phase compensator includes a characteristic switching unit that switches a frequency characteristic between a normal state where the warning vibration wave is not generated by the vibration wave generator and a warning vibration wave generated state where the warning vibration wave is generated by the vibration wave generator. The characteristic switching unit is configured to switch the frequency characteristic such that, in the warning vibration wave generated state, a gain with respect to a prescribed frequency of the warning vibration wave is smaller than a gain with respect to the prescribed frequency in the normal state, and a phase delay with respect to the prescribed frequency is smaller than a phase delay with respect to the prescribed frequency in the normal state.

If a gain with respect to the frequency of the warning vibration wave (hereinafter, referred to as "warning vibration frequency") is high in the warning vibration wave generated state, the warning vibration wave is amplified, and thus, large vibration may be generated. In the configuration described above, the gain characteristic in the phase compensator is switched such that the gain with respect to the warning vibration frequency in the warning vibration wave generated state is smaller than the gain with respect to the waning vibration frequency in the normal state. As a result, it is possible to suppress or avoid generation of large vibration in the warning vibration wave generated state.

In the warning vibration wave generated state, the warning vibration wave may reduce the stability of a control system including the motor controller. In this configuration, the phase characteristic in the phase compensator is switched such that the phase delay with respect to the warning vibration frequency in the warning vibration wave generated state is smaller than phase delay with respect to the warning vibration frequency in the normal state. Consequently, it is possible to suppress or avoid reduction of the stability in the control system including the motor controller in the warning vibration wave generated state.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 1 is a schematic diagram illustrating the schematic configuration of an electric power steering system to which a warning device for a vehicle according to a first embodiment of the invention is applied;

FIG. 12 is a graph illustrating an example of the manner of setting an amplitude of a warning vibration wave with respect to a detected steering torque;

FIG. 14A is a characteristic diagram illustrating a first gain characteristic and a second gain characteristic; and FIG. 14B is a characteristic diagram illustrating a first phase characteristic and a second phase characteristic.

DETAILED DESCRIPTION OF EMBODIMENTS

Figure 2:
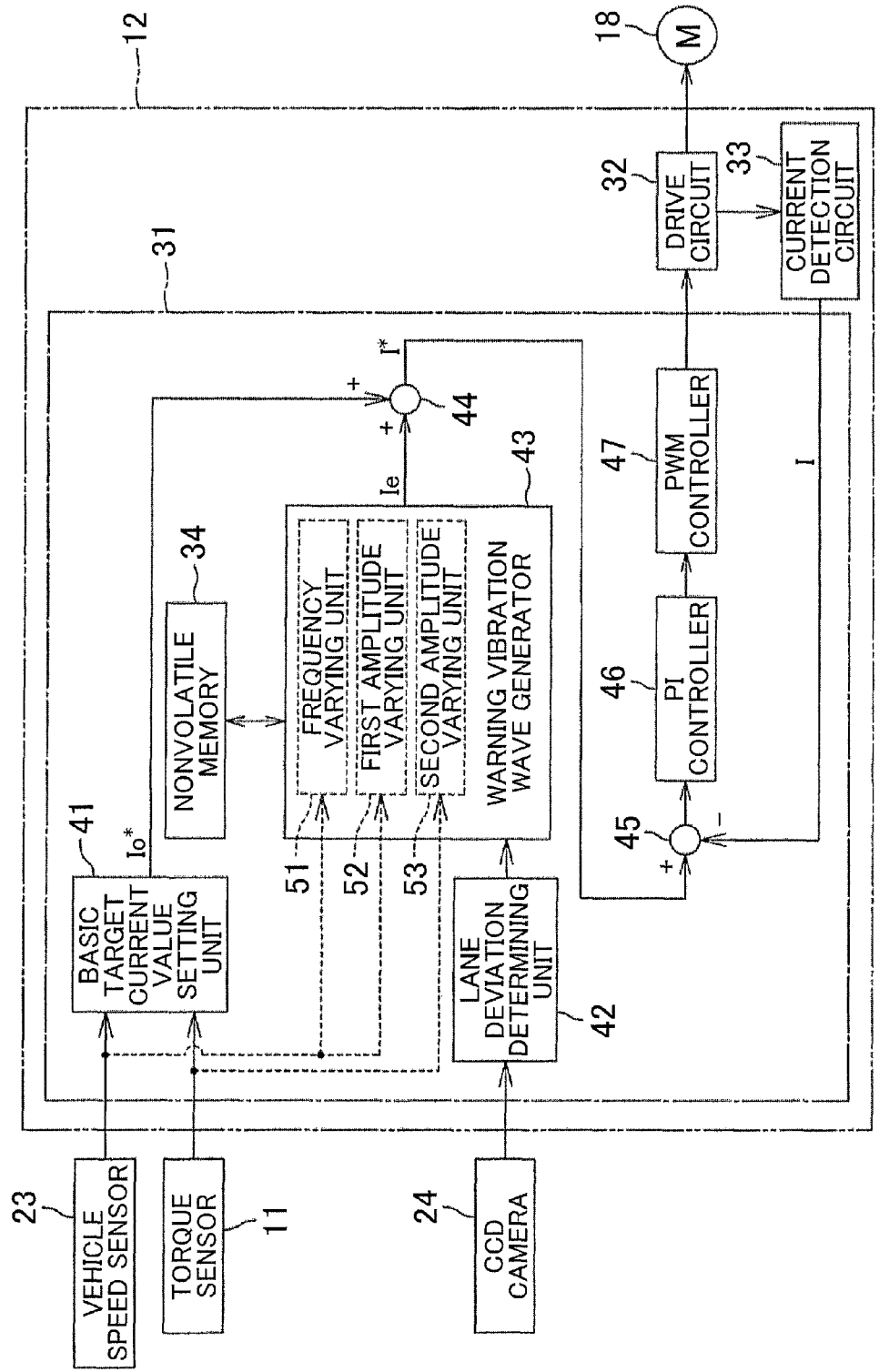
FIG. 2 is a block diagram illustrating the electrical configuration of an ECU.

Hereinafter, example embodiments of the invention will be described in detail with reference to the accompanying drawings. FIG. 1 is a schematic diagram illustrating the schematic configuration of an electric power steering system 1 to which a warning device for a vehicle according to a first embodiment of the invention is applied. The electric power steering (EPS) system 1 includes a steering wheel 2 that is a steering member used to steer a vehicle, a steered mechanism 4 that steers steered wheels 3 in response to rotation of the steering wheel 2, and a steering assist mechanism 5 that assists a driver in executing a steering operation. The steering wheel 2 and the steered mechanism 4 are mechanically connected to each other via a steering shaft 6 and an intermediate shaft 7.

The steering shaft 6 includes an input shaft 8 connected to the steering wheel 2, and an output shaft 9 connected to the intermediate shaft 7. The input shaft 8 and the output shaft 9 are connected to each other via a torsion bar 10 so as to be rotatable relative to each other. A torque sensor 11 is disposed in the vicinity of the torsion bar 10. The torque sensor 11 detects a steering torque T that is applied to the steering wheel 2, based on the relative rotation displacement between the input shaft 8 and the output shaft 9. In the present embodiment, the steering torque T is detected by the torque sensor 11 such that, for example, a torque for steering the vehicle to the right is detected as a positive value and a torque for steering the vehicle to the left is detected as a negative value. The larger the absolute value of the steering torque is, the larger the magnitude of the steering torque is.

The steered mechanism 4 is a rack-and-pinion mechanism including a pinion shaft 13 and a rack shaft 14 that is a steered shaft. Each end of the rack shaft 14 is connected to a corresponding one of the steered wheels 3 via a tie rod 15 and a knuckle arm (not illustrated). The pinion shaft 13 is connected to the intermediate shaft 7. The pinion shaft 13 rotates in response to a steering operation of the steering wheel 2. A distal end (lower end in FIG. 1) of the pinion shaft 13 is connected to a pinion 16.

The rack shaft 14 linearly extends along the lateral direction of the vehicle. A rack 17 that meshes with the pinion 16 is formed at an intermediate portion of the rack shaft 14 in its axial direction. The pinion 16 and the rack 17 convert the rotation of the pinion shaft 13 into an axial motion of the rack shaft 14. The axial motion of the rack shaft 14 allows the steered wheels 3 to be steered.

As the steering wheel 2 is steered (rotated), the rotation of the steering wheel 2 is transmitted to the pinion shaft 13 through the steering shaft 6 and the intermediate shaft 7. The pinion 16 and the rack 17 convert the rotation of the pinion shaft 13 into an axial motion of the rack shaft 14. As a result, the steered wheels 3 are steered. The steering assist mechanism 5 includes an electric motor (EPS electric motor) 18 that assists steering, and a speed reducer 19 that transmits the torque output from the electric motor 18 to the steered mechanism 4. The speed reducer 19 is a worm gear mechanism including a worm shaft 20 and a worm wheel 21 that meshes with the worm shaft 20. The speed reducer 19 is housed in a gear housing 22 that is a transmitting mechanism housing.

The worm shaft 20 is driven to be rotated by the electric motor 18. The worm wheel 21 is connected to the steering shaft 6 so as to be rotatable in the same direction as the rotation direction of the steering shaft 6. The worm wheel 21 is driven to be rotated by the worm shaft 20. As the worm shaft 20 is driven to be rotated by the electric motor 18, the worm wheel 21 is driven to be rotated, and thus the steering shaft 6 rotates. The rotation of the steering shaft 6 is transmitted to the pinion shaft 13 through the intermediate shaft 7. The rotation of the pinion shaft 13 is converted into an axial motion of the rack shaft 14. Thus, the steered wheels 3 are steered. That is, the worm shaft 20 is driven to be rotated by the electric motor 18, so that the steered wheels 3 are steered.

In the vehicle, a vehicle speed sensor 23 that detects a vehicle speed V is disposed, and a CCD camera 24 that captures the image of a road ahead of the vehicle in the travelling direction is mounted. The CCD camera 24 is disposed to monitor the operating state of the vehicle. The steering torque T detected by the torque sensor 11, the vehicle speed V detected by the vehicle speed sensor 23, and an image signal output from the CCD camera 24 is input into an electronic control unit (ECU) 12. The ECU 12 controls the electric motor 18 based on the input signal.

FIG. 2 is a block diagram illustrating the electrical configuration of the ECU 12. The ECU 12 includes a microcomputer 31 that controls the electric motor 18, a drive circuit (inverter circuit) 32 that supplies electric power to the electric motor 18 under the control of the microcomputer 31, and a current detection circuit 33 that detects a motor current (actual current value) I to be applied to the electric motor 18.

The microcomputer 31 includes a CPU and memories (e.g., a ROM, a RAM, and a nonvolatile memory 34) and executes prescribed programs to function as a plurality of the function processing units. The function processing units include a basic target current value setting unit 41, a lane deviation determining unit 42, a warning vibration wave generator 43, a vibration wave adding unit 44, a current deviation computing unit 45, a PI controller 46, and a PWM controller 47.

Figure 3:
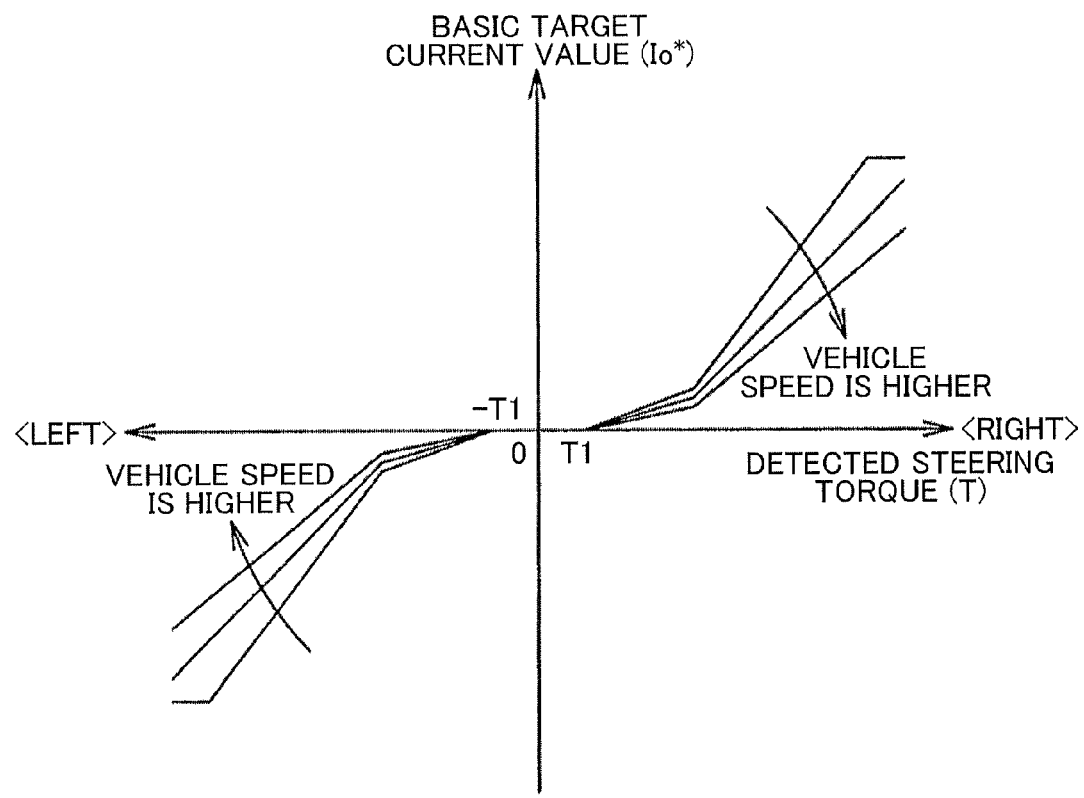
FIG. 3 is a graph illustrating an example of the manner of setting a basic target current value Io* with respect to a detected steering torque T.

The basic target current value setting unit 41 sets a basic target current value Io* based on the steering torque T detected by the torque sensor 11 and the vehicle speed V detected by the vehicle speed sensor 23. An example of the manner of setting the basic target current value Io* with respect to the detected steering torque T is illustrated in FIG. 3. For example, the detected steering torque T for steering the vehicle to the right takes a positive value, whereas the detected steering torque T for steering the vehicle to the left takes a negative value. The basic target current value Io* is set as a positive value when steering assisting force for steering the vehicle to the right should be generated by the electric motor 18, whereas the basic target current value Io* is set as a negative value when steering assisting force for steering the vehicle to the left should be generated by the electric motor 18.

The basic target current value Io* takes a positive value when the detected steering torque T is a positive value, whereas the basic target current value Io* takes a negative value when the detected steering torque T is a negative value. When the detected steering torque T is a considerably low value within a range from −T1 to T1 (for example, T1=0.4 N·m) (torque dead zone), the basic target current value Io* is set to zero. When the detected steering torque T is a value outside the range from −T1 to T1, the basic target current value Io* is set such that the larger the absolute value of the detected steering torque T is, the larger the absolute value of the basic target current value Io* is. Further, the basic target current value Io* is set such that the absolute value of the basic target current value Io* becomes smaller as the vehicle speed V detected by the vehicle speed sensor 23 becomes higher. In this way, a larger steering assisting force is generated when the vehicle is travelling at a low speed, and the steering assisting force is smaller when the vehicle is travelling at a high speed.

Based on the image captured by the CCD camera 24, the lane deviation determining unit 42 determines whether there is a high possibility that the vehicle will deviate from the lane, and then gives the determination result to the warning vibration wave generator 43. The technique of capturing an image of a road ahead of the vehicle in the travelling direction and determining whether there is a high possibility that the vehicle will deviate from the lane is known, as described in, for example, Japanese Patent No. 4292562 and JP 11-34774A, and thus description thereon will be omitted.

When the lane deviation determining unit 42 determines that there is a high possibility that the vehicle will deviate from the lane, the warning vibration wave generator 43 generates a warning vibration wave (excitation signal) Ie containing a plurality of frequency components to issue a warning about the possibility to the driver. The warning vibration wave Ie containing the frequency components is, for example, a wave obtained by combining a plurality of different waves together. In the present embodiment, the magnitude of each of the waves that constitute the warning vibration wave Ie varies periodically.

In the warning vibration wave Ie, a frequency component having a higher frequency preferably has a larger amplitude. When the amplitudes of the frequency components that constitute the warning vibration wave Ie are equal to each other, a frequency component having a higher frequency generates lower warning vibration (in the present embodiment, vibration of the electric motor 18 generated by the frequency component). In the warning vibration wave Ie, if a frequency component having a higher frequency has a larger amplitude, variations in the magnitudes of warning vibration generated by frequency components are reduced.

Figure 4:
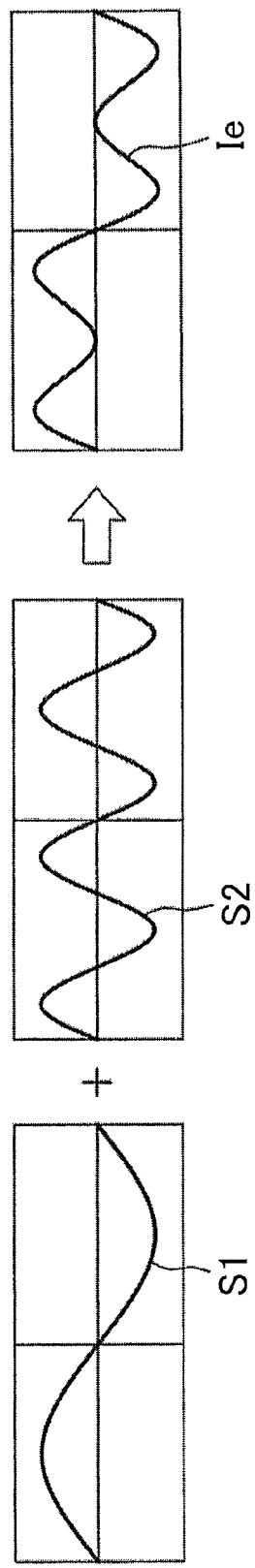
FIG. 4 is a waveform diagram illustrating an example of a waveform of a warning vibration wave.
Figure 5:
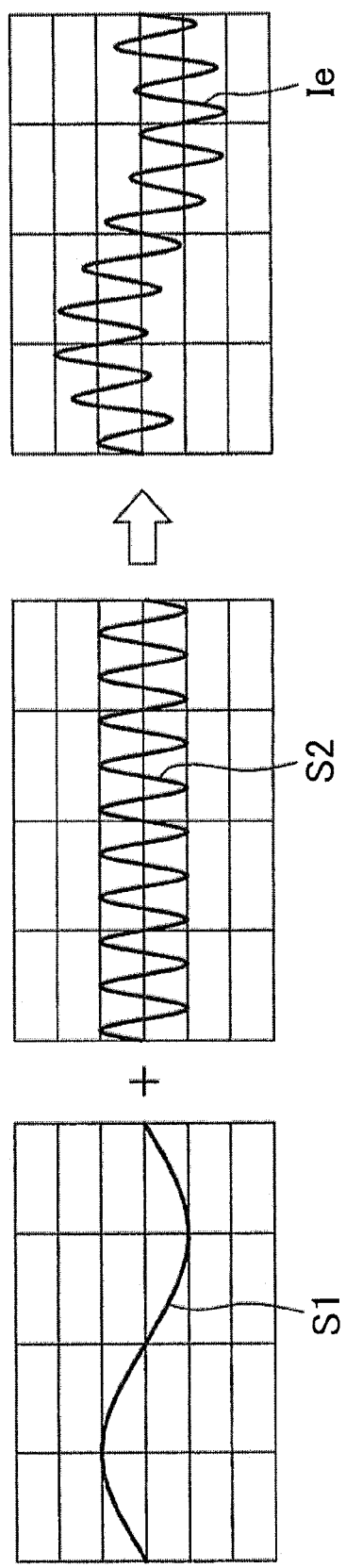
FIG. 5 is a waveform diagram illustrating another example of a waveform of a warning vibration wave.

As illustrated in, for example, FIG. 4 or FIG. 5, the warning vibration wave Ie may be a wave obtained by combining (superimposing) a first sinusoidal wave S1 and a second sinusoidal wave S2 that are different in frequency from each other. In the example in FIG. 4, the amplitude of the first sinusoidal wave S1 is same as that of the second sinusoidal wave S2, but the frequency of the second sinusoidal wave S2 is three times that of the first sinusoidal wave S1. In the example in FIG. 5, the amplitude of the first sinusoidal wave S1 is same as that of the second sinusoidal wave S2, but the frequency of the second sinusoidal wave S2 is ten times that of the first sinusoidal wave S1.

Figure 6:
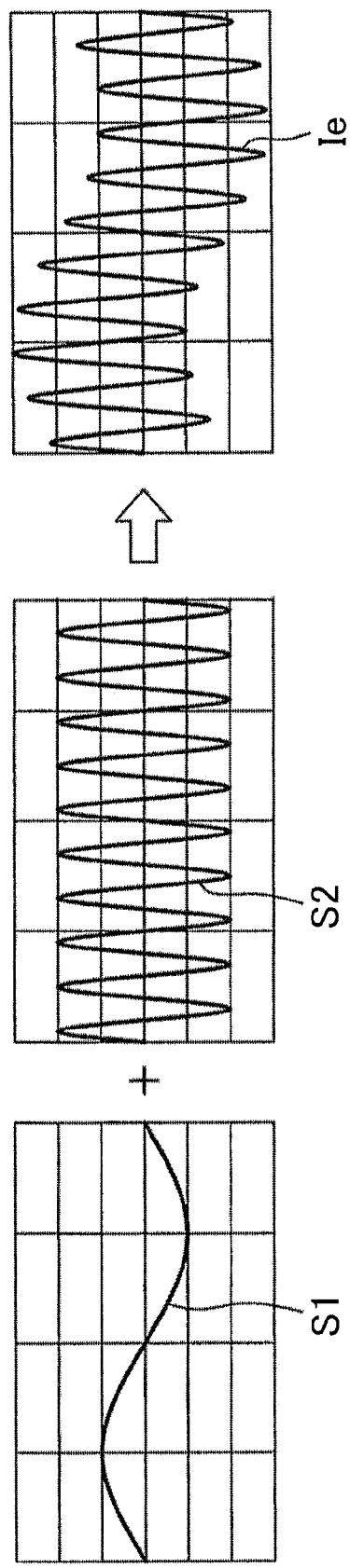
FIG. 6 is a waveform diagram illustrating further another example of a waveform of a warning vibration wave.

As illustrated in, for example, FIG. 6, the warning vibration wave Ie may be a wave obtained by combining (superimposing) a first sinusoidal wave S1 and a second sinusoidal wave S2 that are different in frequency and amplitude from each other. In the example in FIG. 6, the frequency of the second sinusoidal wave S2 is ten times that of the first sinusoidal wave S1, and the amplitude of the second sinusoidal wave S2 is twice that of the first sinusoidal wave S1. In other words, in the example in FIG. 6, in the warning vibration wave Ie, a frequency component having a higher frequency (S2) has a larger amplitude.

Figure 7:
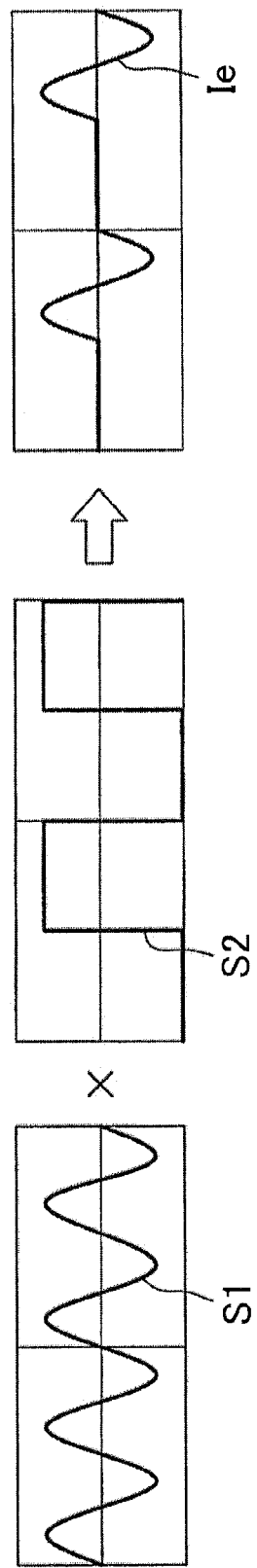
FIG. 7 is a waveform diagram illustrating yet another example of a waveform of a warning vibration wave.

As illustrated in FIG. 7, the warning vibration wave Ie may be a wave obtained by combining (multiplexing) a sinusoidal wave S1 and a rectangular wave S2. The warning vibration wave Ie may be a wave obtained by combining three or more waves. The frequency of each frequency component contained in the warning vibration wave Ie (frequency of each of the waves that constitute the warning vibration wave Ie) is set to a frequency other than a resonance frequency of the vehicle. Thus, it is possible to prevent the situation where the vehicle resonates with the warning vibration to generate abnormally large vibration.

Figure 8:
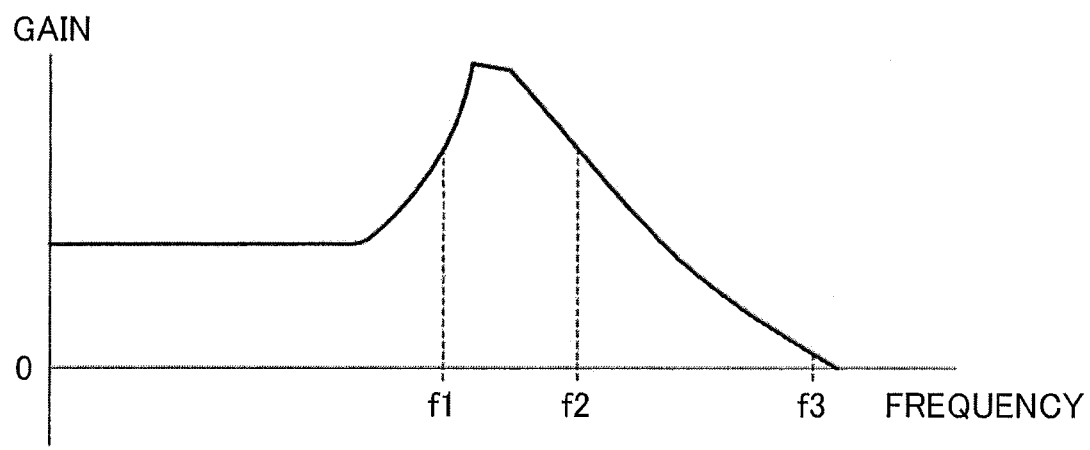
FIG. 8 is a graph illustrating the frequency transmission characteristic of a yaw rate with respect to a steering angle.

The frequency of each frequency component contained in the warning vibration wave Ie (frequency of each of the waves that constitute the warning vibration wave Ie) is preferably equal to or higher than a response frequency at which the gain is substantially equal to zero in the frequency transmission characteristic of the yaw rate with respect to the steering angle. FIG. 8 illustrates the frequency transmission characteristic of the yaw rate with respect to the steering angle. In FIG. 8, $f_3$ is a response frequency at which the gain becomes substantially equal to zero. In FIG. 8, a frequency within a range from $f_1$ to $f_2$ is a resonance frequency of the vehicle. If the frequency of each of the frequency components contained in the warning vibration wave Ie is equal to or higher than the response frequency of $f_3$, the warning vibration is restrained or prevented from affecting the behavior of the vehicle.

Data of the warning vibration wave is, for example, created in advance, and stored in the nonvolatile memory 34. The warning vibration wave generator 43 generates the warning vibration wave based on the data of the warning vibration wave stored in the nonvolatile memory 34. The vibration wave adding unit 44 computes a target current value I* by adding the warning vibration wave Ie generated by the warning vibration wave generator 43 to the basic target current value Io* set by the basic target current value setting unit 41. The current deviation computing unit 45 computes a deviation between the target current value I* obtained by the vibration wave adding unit 44 and the actual current value I detected by the current detection circuit 33 (current deviation ΔI=I*−I).

By executing PI computation on the current deviation ΔI computed by the current deviation computing unit 45, the PI controller 46 generates a drive command value for bringing the current I to be applied to the electric motor 18 to the target current value I*. The PWM controller 47 generates a PWM control signal with a duty ratio that corresponds to the drive command value, and supplies the PWM control signal to the drive circuit 32. Thus, electric power corresponding to the drive command value is supplied to the electric motor 18.

The current deviation computing unit 45 and the PI controller 46 constitute a current feedback controller. Due to the operation of the current feedback controller, the motor current I to be applied to the electric motor 18 is controlled so as to approach the target current value I*. In the first embodiment, when the lane deviation determining unit 42 determines that there is a high possibility that the vehicle will deviate from the lane, the warning vibration wave Ie is generated by the warning vibration wave generator 43. The warning vibration wave Ie is added to the basic target current value Io*, whereby the target current value I* is computed. The motor current I to be applied to the electric motor 18 is controlled so as to approach the target current value I*. Therefore, when the lane deviation determining unit 42 determines that there is a high possibility that the vehicle will deviate from the lane, the warning vibration corresponding to the warning vibration wave Ie is applied to the steering wheel 2. Then, the driver is able to recognize that there is a high possibility that the vehicle will deviate from the lane.

When the vehicle travels on a rough road, road noise is transmitted from the road surface to the steering wheel 2 through, for example, tires, on the basis of the bumps of the road surface. Thus, the warning vibration may be lost in the road noise. In the first embodiment, the frequency components are contained in the warning vibration wave Ie. Therefore, even if the frequency components contained in the warning vibration wave Ie include a frequency component that coincides with the frequency of the road noise, other frequency components that do not coincide with the frequency of the road noise allow the warning vibration to be transmitted to the driver. Specifically, even if there is road noise, the warning vibration is transmitted to the driver.

While the first embodiment of the invention has been described above, the invention may be implemented in various other embodiments. For example, the frequency of the warning vibration wave Ie may be varied depending on the vehicle speed, wheel speed, engine speed, or time. In this case, the frequency of the warning vibration wave Ie means frequencies of the multiple frequency components contained in the warning vibration wave Ie (multiple waves that constitute the warning vibration wave Ie).

Figure 9:
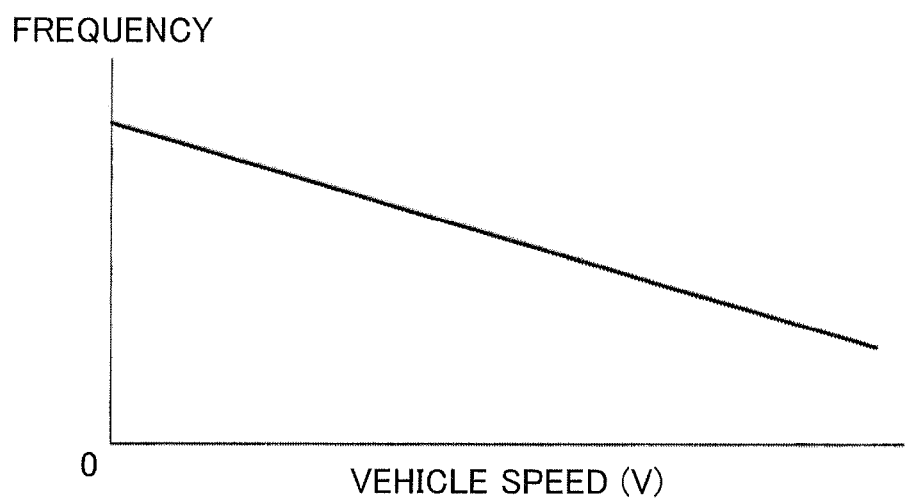
FIG. 9 is a graph illustrating an example of the manner of setting a frequency of a warning vibration wave with respect to a vehicle speed.

Description will be provided on a case where the frequency of the warning vibration wave Ie is varied depending on vehicle speed. As indicated by a broken line in FIG. 2, a frequency varying unit 51 is disposed in the warning vibration wave generator 43. The frequency varying unit 51 varies the frequency of the warning vibration wave Ie in such a manner that the frequency of the warning vibration wave Ie becomes lower as vehicle speed V detected by the vehicle speed sensor 23 becomes higher. More specifically, the frequency varying unit 51 varies the frequency of each of the frequency components contained in the warning vibration wave Ie in such a manner that the frequency becomes lower as the vehicle speed V detected by the vehicle speed sensor 23 becomes higher. FIG. 9 illustrates an example of the manner of setting the frequency of a basic wave with respect to the vehicle speed V. In this case, the basic wave is set to a frequency component having the lowest frequency among the frequency components contained in the warning vibration wave Ie.

Such variation of the frequency of the warning vibration wave may be made, for example, as follows. Each of the frequencies of the multiple waves that constitute the warning vibration wave is multiplied by a vehicle speed gain that becomes smaller as the vehicle speed V detected by the vehicle speed sensor 23 becomes higher, whereby the frequencies of the waves are varied. Then, the waves the frequencies of which have been varied are combined together to generate a warning vibration wave.

Alternatively, multiple kinds of data of the warning vibration wave the frequency of which varies depending on the vehicle speed are stored in the nonvolatile memory 34 in advance. From the multiple kinds of the data of the warning vibration wave stored in the nonvolatile memory 34, a piece of data of the warning vibration wave, which corresponds to the vehicle speed V detected by the vehicle speed sensor 23, is selected. The frequency of road noise becomes higher as the vehicle speed becomes higher. Thus, the frequency of each of the frequency components contained in the warning vibration wave Ie is varied so as to become lower as the vehicle speed V becomes higher, whereby the frequencies of the frequency components are less likely to coincide with the frequency of the road noise. As a result, the warning vibration is effectively transmitted to the driver.

Figure 10:
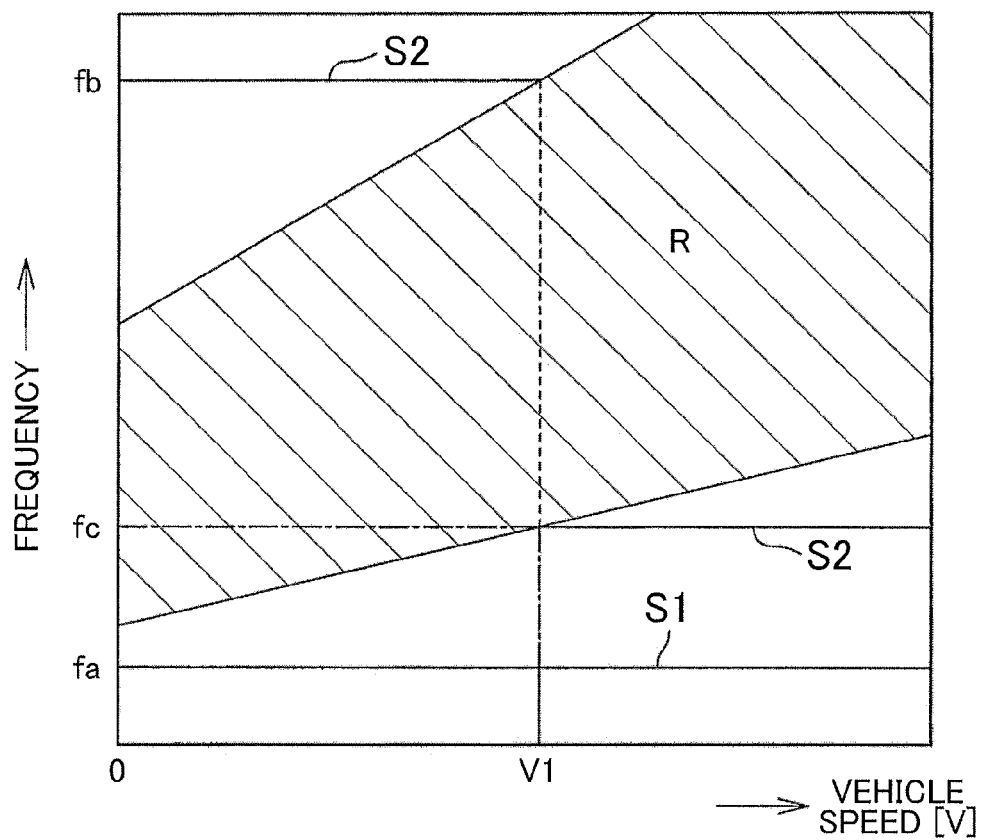
FIG. 10 is a graph illustrating another example of the manner of setting a frequency of a warning vibration wave with respect to a vehicle speed.

Next, another example of the operation of the frequency varying unit 51 will be described. Description will be provided on the case where a first sinusoidal wave S1 and a second sinusoidal wave S2 that are different in frequency from each other are superimposed on each other to generate the warning vibration wave Ie. The frequency varying unit 51 varies at least one of the frequency of the first sinusoidal wave S1 and the frequency of the second sinusoidal wave S2 depending on the vehicle speed V. FIG. 10 illustrates an example of the manner of setting the frequencies of the first sinusoidal wave S1 and the second sinusoidal wave S2 with respect to the vehicle speed V. In FIG. 10, the abscissa axis represents the vehicle speed V, while the ordinate axis represents the frequency of the first sinusoidal wave S1 and the second sinusoidal wave S2. In FIG. 10, a hatched range R is a frequency range where a possibility that road noise will be generated is high with respect to the vehicle speed V (hereinafter, referred to as "noise range"). In order to obtain the noise range R, for example, the vehicle is moved at various speeds, the waveforms of road noise transmitted from a road surface to the steering wheel through the steering mechanism are measured, and then the measured road noise waveforms are analyzed.

The frequency of the first sinusoidal wave S1 is set to a prescribed frequency fa regardless of the vehicle speed V. The prescribed frequency fa is set to a frequency lower than the lower limit frequency of the noise range R. When the vehicle speed V is equal to or lower than a prescribed vehicle speed V1, the frequency of the second sinusoidal wave S2 is set to a prescribed value fb (fb>fa) that is higher than the higher limit frequency of the noise range R within a vehicle speed range equal to or lower than the prescribed vehicle speed V1. When the vehicle speed V exceeds the prescribed vehicle speed V1, the frequency of the second sinusoidal wave S2 is set to a prescribed value fc (fa<fc<fb) that is lower than the lower limit frequency of the noise range R within a vehicle speed range higher than the prescribed vehicle speed V1.

Figure 11:
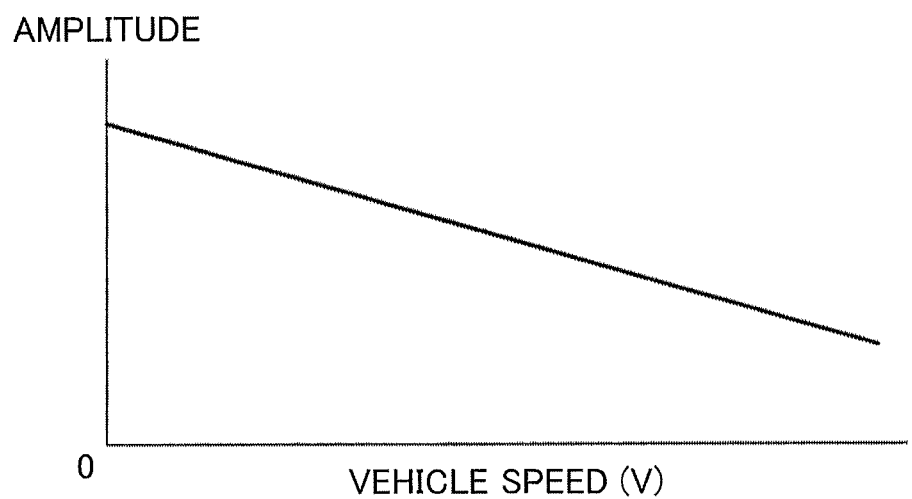
FIG. 11 is a graph illustrating an example of the manner of setting an amplitude of a warning vibration wave with respect to a vehicle speed.

The amplitude of the warning vibration wave Ie may be varied depending on, for example, vehicle speed, wheel speed, engine speed, or time. For example, as indicated by a broken line in FIG. 2, a first amplitude varying unit 52 is disposed in the warning vibration wave generator 43. As illustrated in FIG. 11, the first amplitude varying unit 52 varies the amplitude of the warning vibration wave Ie in such a manner that the amplitude of the warning vibration wave Ie becomes smaller as the vehicle speed V detected by the vehicle speed sensor 23 becomes higher.

Such variation of the amplitude of the warning vibration wave may be made, for example, by multiplying the warning vibration wave the amplitude of which has not been varied yet by a vehicle speed gain that becomes smaller as the vehicle speed V detected by the vehicle speed sensor 23 becomes higher. As can be understood from the graph in FIG. 3, a steering assisting force (assist torque) generated by the electric motor 18 becomes smaller as the vehicle speed becomes higher. Therefore, if the amplitude of the warning vibration wave Ie is maintained constant regardless of the vehicle speed, the ratio of the warning vibration to the assist torque increases as the vehicle speed becomes higher. Therefore, the amplitude of each of the waves that constitute the warning vibration wave Ie is varied such that the amplitude becomes smaller as the vehicle speed V becomes higher, and thus, the ratio of the warning vibration to the assist torque is prevented from varying as much as possible.

The amplitude of the warning vibration wave Ie may be varied depending on the steering torque. Specifically, as indicated by a broken line in FIG. 2, a second amplitude varying unit 53 is disposed in the warning vibration wave generator 43. The second amplitude varying unit 53 varies the amplitude of the warning vibration wave Ie based on the steering torque T detected by the torque sensor 11. FIG. 12 illustrates an example of the manner of setting the amplitude of the warning vibration wave Ie with respect to the detected steering torque T. When the detected steering torque T is within a range from −T2 to T2 (for example, T2=1.0 N·m), the amplitude of the warning vibration wave Ie is set to a prescribed value larger than zero. When the detected steering torque T is outside the range from −T2 to T2, the amplitude of the warning vibration wave Ie is set so as to steeply decrease, and when the absolute value of the detected steering torque T is equal to or larger than a prescribed value T3, the amplitude of the warning vibration wave Ie is set to zero. Thus, when the absolute value of the detected steering torque T is equal to or larger than the prescribed value T3, the warning vibration is stopped. This is because the driver is considered to perform a steering operation intentionally when the absolute value of the detected steering torque T is equal to or larger than the prescribed value T3, and thus, the warning vibration applied to the steering wheel 2 in such a case may hinder the steering operation.

Such variation of the amplitude of the warning vibration wave may be made, for example, by multiplying the warning vibration wave the amplitude of which has not been varied yet by a torque gain that is set based on the detected steering torque T. Frequency control by the frequency varying unit 51 and amplitude control by the first amplitude varying unit 52 may be simultaneously executed. Frequency control by the frequency varying unit 51 and amplitude control by the second amplitude varying unit 53 may be simultaneously executed. Amplitude control by the first amplitude varying unit 52 and amplitude control by the second amplitude varying unit 53 may be simultaneously executed. In this case, a final warning vibration wave is generated by multiplying the warning vibration wave the amplitude of which has not been varied yet by the vehicle speed gain used in the first amplitude varying unit 52 and then multiplying the resultant warning vibration wave by the torque gain used in the second amplitude varying unit 53. Further, frequency control by the frequency varying unit 51, amplitude control by the first amplitude varying unit 52 and amplitude control by the second amplitude varying unit 53 may be simultaneously executed.

Next, another embodiment of the invention will be described. When the frequency of the warning vibration becomes higher, the driver of the vehicle is less likely to feel the warning vibration as the amplitude of the warning vibration becomes smaller. Especially, when the frequency is equal to or higher than a certain frequency and the amplitude is equal to or smaller than a certain amplitude, the driver can hardly feel the warning vibration. In addition, when the frequency of the warning vibration becomes lower, the driver is less likely to feel the warning vibration as the amplitude of the warning vibration becomes larger. Especially, when the frequency is equal to or lower than a certain frequency and the amplitude is equal to or larger than a certain amplitude, the driver can hardly feel the warning vibration. Thus, in a two-dimensional graph having an abscissa axis, along which the frequency of the warning vibration wave is plotted, and an ordinate axis along which the amplitude of the warning vibration wave is plotted, a forbidden region is set such that a prescribed frequency threshold and a prescribed amplitude threshold are set as the border values of the forbidden region. For example, a region in which the frequency is higher than or equal to a first prescribed frequency threshold and the amplitude is smaller than or equal to a first prescribed amplitude threshold, or a region in which the frequency is lower than or equal to a second prescribed frequency threshold and the amplitude is larger than or equal to a second prescribed amplitude threshold is set as the forbidden region. The number of the forbidden regions is not particularly limited. That is, the forbidden region indicates the vibration that cannot be felt by the driver of the vehicle, using the frequency and the amplitude. Thus, the combination of a frequency and an amplitude in the forbidden region should be avoided. Specifically, the characteristics of the frequency and amplitude with respect to the vehicle speed are set in advance such that a frequency value and an amplitude value of a wave to be generated by the warning vibration wave generator 43 are not contained in the forbidden region. Alternatively, when a frequency value or an amplitude value is contained in the forbidden region, restriction may be imposed such that the frequency value or the amplitude value is set as the border value of the forbidden region. Further alternatively, the prescribed frequency threshold or the prescribed frequency threshold, which is used as the border value, may be varied depending on the vehicle speed. Especially, if the amplitude threshold is increased with an increase in the vehicle speed, it becomes easier to distinguish the road noise that increases with an increase in the vehicle speed and the warning vibration from each other. According to this embodiment, it is possible to reliably transmit the warning vibration to the driver.

In the first embodiment, the warning vibration is generated by the electric motor 18 that generates a steering assisting force in the electric power steering system 1. However, when a telescopic adjustment device that adjusts the position of the steering wheel 2 in the vehicle longitudinal direction is disposed in the vehicle, the warning vibration may be generated by a telescopic adjustment electric motor included in the telescopic adjustment device. When a tilt adjustment device that adjusts the position of the steering wheel 2 in the up-down direction is disposed in the vehicle, the warning vibration may be generated by a tilt adjustment electric motor included in the tilt adjustment device.

Figure 13:
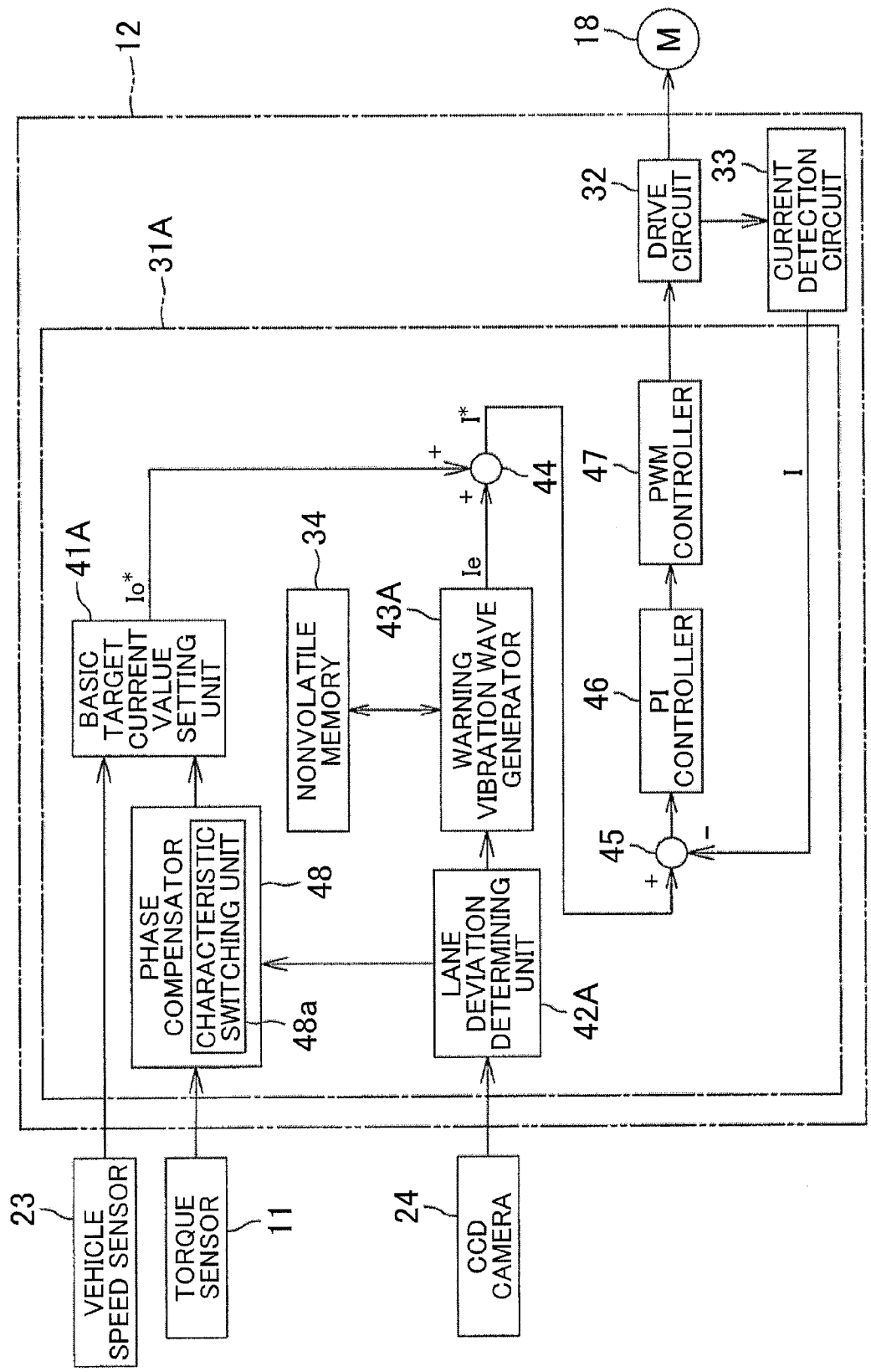
FIG. 13 is a block diagram illustrating the electrical configuration of an ECU used in a second embodiment of the invention.

With reference to FIG. 13, description will be provided on an electric power steering system to which a warning device for a vehicle according to a second embodiment of the invention is applied. The schematic configuration of the electric power steering system is the same as that in the first embodiment of the invention illustrated in FIG. 1. FIG. 13 is a block diagram illustrating the electrical configuration of an ECU 12 used in the second embodiment. In FIG. 13, the portions corresponding to those in FIG. 2 are denoted by the same reference symbols as those in FIG. 2.

The ECU 12 includes a microcomputer 31A that controls the electric motor 18, the drive circuit (inverter circuit) 32 supplies electric power to the electric motor 18 under the control of the microcomputer 31A, and the current detection circuit 33 that detects a motor current (actual current value) I to be applied to the electric motor 18. The microcomputer 31A includes a CPU and memories (e.g., a ROM, a RAM, and the nonvolatile memory 34) and executes prescribed programs to function as a plurality of function processing units. The function processing units include a basic target current value setting unit (basic assist current value setting unit) 41A, a lane deviation determining unit 42A, a warning vibration wave generator 43A, the vibration wave adding unit 44, the current deviation computing unit 45, the PI controller 46, the PWM controller 47, and a phase compensator 48.

Based on an image captured by the CCD camera 24, the lane deviation determining unit 42A determines whether there is a high possibility that the vehicle will deviate from the lane, and then gives the determination result to the phase compensator 48 and the warning vibration wave generator 43A. When the lane deviation determining unit 42A determines that there is a high possibility that the vehicle will deviate from the lane, the warning vibration wave generator 43A generates a warning vibration wave (excitation signal) Ie with a prescribed frequency fe to issue a warning about the possibility to the driver. The waveform of the warning vibration wave Ie varies in magnitude periodically. Data of the warning vibration wave is, for example, created in advance and stored in the nonvolatile memory 34. The warning vibration wave generator 43A generates the warning vibration wave based on the data of the warning vibration wave stored in the nonvolatile memory 34.

The phase compensator 48 executes a phase compensation process to advance the phase of steering torque T detected by the torque sensor 11, thereby stabilizing a system. The phase compensator 48 executes the phase compensation process on the detected steering torque T on the basis of one of a first frequency characteristic and a second frequency characteristic that are set in advance. The phase compensator 48 includes a characteristic switching unit 48a that switches the frequency characteristic between the first frequency characteristic and the second frequency characteristic on the basis of the determination result provided by the lane deviation determining unit 42A, When the lane deviation determining unit 42A determines that there is not a high possibility that the vehicle will deviate from the lane (normal state), the characteristic switching unit 48a sets the first frequency characteristic as a frequency characteristic of the phase compensator 48. On the other hand, when the lane deviation determining unit 42A determines that there is a high possibility that the vehicle will deviate from the lane (warning vibration wave generated state), the characteristic switching unit 48a sets the second frequency characteristic as the frequency characteristic of the phase compensator 48.

The first frequency characteristic and the second frequency characteristic will be described below. A gain characteristic and a phase characteristic included in the first frequency characteristic will be referred to as a first gain characteristic and a first phase characteristic, respectively. Similarly, a gain characteristic and a phase characteristic included in the second frequency characteristic will be referred to as a second gain characteristic and a second phase characteristic, respectively. A broken line $L1_G$ in FIG. 14A indicates the first gain characteristic, and a continuous line $L2_G$ in FIG. 14A depicts the second gain characteristic. A broken line $L1_P$ in FIG. 14B indicates the first phase characteristic, and a continuous line $L2_P$ in FIG. 14B indicates the second phase characteristic.

As illustrated in FIG. 14A, a gain with respect to a frequency fe (hereinafter, referred to as "warning vibration frequency fe") of the warning vibration wave Ie in the second gain characteristic $L2_G$ is smaller than a gain with respect to the warning vibration frequency fe in the first gain characteristic $L1_G$. As illustrated in FIG. 14B, phase delay with respect to the warning vibration frequency fe in the second phase characteristic $L2_P$ is smaller than phase delay with respect to the warning vibration frequency fe in the first phase characteristic $L1_P$.

The basic target current value setting unit 41A sets a basic target current value (basic assist current value) Io* based on a steering torque the phase of which is compensated by the phase compensator 48 (hereinafter, referred to as "phase-compensated torque T") and vehicle speed V detected by the vehicle speed sensor 23. An example of the manner of setting the basic target current value Io* with respect to the phase-compensated torque T may be same as the example of the manner of setting the basic target current value Io* with respect to the detected steering torque T, which is illustrated in FIG. 3.

The vibration wave adding unit 44 computes a target current value I* by adding the warning vibration wave Ie generated by the warning vibration wave generator 43A to the basic target current value Io* set by the basic target current value setting unit 41A. The current deviation computing unit 45 computes a deviation between the target current value I* obtained by the vibration wave adding unit 44 and an actual current value I detected by the current detection circuit 33 (current deviation ΔI=I*−I).

By executing PI computation on the current deviation ΔI computed by the current deviation computing unit 45, the PI controller 46 generates a drive command value for bringing the current I to be applied to the electric motor 18 to the target current value I*. The PWM controller 47 generates a PWM control signal with a duty ratio that corresponds to the drive command value, and supplies the PWM control signal to the drive circuit 32. Thus, electric power corresponding to the drive command value is supplied to the electric motor 18.

The current deviation computing unit 45 and the PI controller 46 constitute a current feedback controller. Due to the operation of the current feedback controller, the motor current I to be applied to the electric motor 18 is controlled so as to approach the target current value I*. In the second embodiment, when the lane deviation determining unit 42A determines that there is a high possibility that the vehicle will deviate from the lane, the warning vibration wave Ie is generated by the warning vibration wave generator 43A. The warning vibration wave Ie is added to the basic target current value Io*, whereby the target current value I* is computed. The motor current I to be applied to the electric motor 18 is controlled so as to approach the target current value I*. Therefore, when the lane deviation determining unit 42A determines that there is a high possibility that the vehicle will deviate from the lane, the warning vibration corresponding to the warning vibration wave Ie is applied to the steering wheel 2. In this way, the driver is able to recognize that there is a high possibility that the vehicle will deviate from the lane.

In the warning vibration wave generated state, an assisting function works on the warning vibration wave, and thus an assisting force corresponding to the warning vibration wave is generated. Therefore, if a gain with respect to the warning vibration frequency fe is high in the warning vibration wave generated state, the warning vibration wave is amplified, and thus, large vibration may be generated. In the second embodiment, the gain characteristic in the phase compensator 48 is switched to the second gain characteristic $L2_G$ in the warning vibration wave generated state. As a result, a gain with respect to the warning vibration frequency fe in the warning vibration wave generated state is smaller than a gain with respect to the warning vibration frequency fe in the normal state. As a result, it is possible to suppress or avoid generation of large vibration in the warning vibration wave generated state.

In the warning vibration wave generated state, the warning vibration wave may reduce the stability of a control system of the electric power steering system 1. In the second embodiment, the phase characteristic in the phase compensator 48 is switched to the second phase characteristic $L2_P$ in the warning vibration wave generated state. As a result, the phase delay with respect to the warning vibration frequency fe in the warning vibration wave generated state is smaller than phase delay with respect to the warning vibration frequency fe in the normal state. Consequently, it is possible to suppress or avoid reduction of the stability in the control system of the electric power steering system 1 in the warning vibration wave generated state.

In the second embodiment as well, the warning vibration wave Ie may contain a plurality of frequency components. In this case, the characteristic switching unit 48a switches the frequency characteristic of the phase compensator 48 in such a manner that, in the warning vibration wave generated state, a gain with respect to the frequency of each of the frequency components contained in the warning vibration wave Ie is smaller than a gain with respect to the frequency of a corresponding one of the frequency components in the normal state, and a phase delay with respect to the frequency of each of the frequency components is smaller than a phase delay with respect to the frequency of a corresponding one of the frequency components in the normal state.

In the first and second embodiments, when it is determined that there is a high possibility that the vehicle will deviate from the lane, the warning vibration wave generator 43, 43A generates the warning vibration wave Ie. However, the warning vibration wave generator 43 may generate a warning vibration wave when the operating state of the vehicle is a prescribed state other than the state where there is a high possibility that the vehicle will deviate from the lane.

What is claimed is:

1. A warning device for a vehicle comprising:
    a vibration wave generator that generates a warning vibration wave based on an operating state of a vehicle; and
    a vibration applying device that applies warning vibration to a steering member based on the warning vibration wave generated by the vibration wave generator,
    the warning vibration wave containing a plurality of frequency components,
    wherein the vibration applying device applies the warning vibration wave in such a way whereby the frequency component having a higher frequency has a larger amplitude.

2. The warning device for a vehicle according to claim 1, wherein:
    the vehicle includes a torque detector that detects a steering torque; and
    the vibration wave generator includes a second amplitude varying device that varies an amplitude of the warning vibration wave based on the steering torque detected by the torque detector.

3. The warning device for a vehicle according to claim 1, wherein each of the frequency components contained in the warning vibration wave has a frequency different from a resonance frequency of the vehicle.

4. The warning device for a vehicle according to claim 3, wherein each of the frequency components contained in the warning vibration wave has a frequency equal to or higher than a response frequency at which a gain is substantially equal to zero in a frequency transmission characteristic of a yaw rate with respect to a steering angle.

5. The warning device for a vehicle according to claim 1, wherein the vibration applying device includes an electric motor for electric power steering, the electric motor being used to generate steering assisting force.

6. The warning device for a vehicle according to claim 1, wherein the vibration applying device includes a telescopic adjustment electric motor that adjusts a position of the steering member in a vehicle longitudinal direction, or a tilt adjustment electric motor that adjusts a position of the steering member in an up-down direction.

7. A warning device for a vehicle comprising:
    a vibration wave generator that generates a warning vibration wave based on an operating state of a vehicle; and
    a vibration applying device that applies warning vibration to a steering member based on the warning vibration wave generated by the vibration wave generator,
    the warning vibration wave containing a plurality of frequency components
    wherein:
    the vehicle includes a vehicle speed detector that detects a vehicle speed,
    the vibration wave generator includes a frequency varying device that varies a frequency of the warning vibration wave based on the vehicle speed detected by the vehicle speed detector, and
    the frequency varying device is configured to decrease the frequency of the warning vibration wave as the vehicle speed increases.

8. The warning device for a vehicle according to claim 7, wherein the frequency varying device is configured to vary the frequency of the warning vibration wave discontinuously with respect to the vehicle speed.

9. The warning device for a vehicle according to claim 7, wherein the vibration wave generator includes a first amplitude varying device that varies an amplitude of the warning vibration wave based on the vehicle speed detected by the vehicle speed detector.

10. The warning device for a vehicle according to claim 7, wherein an amplitude and a frequency of the warning vibration wave are set such that a combination of the amplitude and the frequency falls outside a region where the frequency is equal to or higher than a prescribed frequency threshold and the amplitude is equal to or smaller than a prescribed vibration amplitude threshold, and the prescribed vibration amplitude threshold is increased with an increase in a vehicle speed.

11. A warning device for a vehicle comprising:
    an electric motor that applies steering assisting force to a steered mechanism of a vehicle;
    a torque detector that detects a steering torque;

a phase compensator that executes phase compensation on the steering torque detected by the torque detector;

a basic assist current value setting unit that sets a basic assist current value, based on a phase-compensated torque that is a steering torque the phase of which is compensated by the phase compensator;

a vibration wave generator that generates a warning vibration wave having a prescribed frequency based on an operating state of the vehicle;

a target current value computing unit that computes a target current value for the electric motor by adding the warning vibration wave generated by the vibration wave generator to the basic assist current value set by the basic assist current value setting unit; and a motor controller that controls the electric motor based on the target current value computed by the target current value computing unit, wherein the phase compensator includes a characteristic switching unit that switches a frequency characteristic between a normal state where the warning vibration wave is not generated by the vibration wave generator and a warning vibration wave generated state where the warning vibration wave is generated by the vibration wave generator, and the characteristic switching unit is configured to switch the frequency characteristic such that, in the warning vibration wave generated state, a gain with respect to a prescribed frequency of the warning vibration wave is smaller than a gain with respect to the prescribed frequency in the normal state, and a phase delay with respect to the prescribed frequency is smaller than a phase delay with respect to the prescribed frequency in the normal state.

12. The warning device for a vehicle according to claim 11, wherein:

the warning vibration wave contains a plurality of frequency components; and the characteristic switching unit is configured to switch the frequency characteristic such that, in the warning vibration wave generated state, a gain with respect to a frequency of each of the frequency components contained in the warning vibration wave is smaller than a gain with respect to a frequency of a corresponding one of the frequency components in the normal state, and a phase delay with respect to the frequency of each of the frequency components is smaller than a phase delay with respect to the frequency of a corresponding one of the frequency components in the normal state.

* * * * *